United States Patent [19]

Curatolo

[11] 4,091,866
[45] May 30, 1978

[54] COMBINATION DOOR LOCK AND ELECTRICAL SWITCH

[76] Inventor: Frank Curatolo, 130 Overlook Ave., Hackensack, N.J. 07602

[21] Appl. No.: 743,174

[22] Filed: Nov. 19, 1976

[51] Int. Cl.² ............... F24F 1/00; E05B 37/12; H01H 27/06
[52] U.S. Cl. ................... 165/138; 70/292; 200/61.68; 236/1 R
[58] Field of Search ............... 70/292, 341, DIG. 15; 200/61.68, 61.67, 61.64, 61.62; 236/1 R; 165/137, 138

[56] References Cited

U.S. PATENT DOCUMENTS

| 2,301,290 | 11/1942 | Knight | 200/61.68 |
|---|---|---|---|
| 2,319,084 | 5/1943 | Olofson | 200/61.64 |
| 2,354,035 | 7/1944 | Maier | 200/42 R |
| 2,637,801 | 5/1953 | Kelley et al. | 200/61.68 |
| 2,679,039 | 5/1954 | Koppl | 200/61.64 |
| 2,752,445 | 6/1956 | Navarrete | 200/61.68 |
| 3,514,557 | 5/1970 | Jette, Jr. | 200/61.68 |
| 3,570,285 | 3/1971 | Hawkins | 200/61.64 |
| 3,802,233 | 4/1974 | Riley | 200/61.68 |
| 3,833,899 | 9/1974 | Blosse | 200/61.68 |

Primary Examiner—Charles J. Myhre
Assistant Examiner—Sheldon Richter
Attorney, Agent, or Firm—Bauer, Amer & King

[57] ABSTRACT

A door lock, particularly appropriate for a hotel or motel room, which is effectively operated from either the room side or the corridor side to lock the door closed for security purposes, and from the latter or corridor side, additionally is effective to terminate electrical services within the room, e.g. the air conditioner, to thereby minimize the wasteful use of electricity.

3 Claims, 4 Drawing Figures

COMBINATION DOOR LOCK AND ELECTRICAL SWITCH

The present invention relates generally to improvements for more efficient and economic management of hotels, motels, and other such commercial establishments, and more particularly to a door lock which is effective for its primary use as a security device, and also as a control switch for electrically operated apparatus, such as the room air conditioner.

Early patented literature, as exemplified by U.S. Pat. Nos. 941,777 and 1,464,788, represent efforts to maximize the use or functionality of door security locks. More particularly, mechanical apparatus associated with the lock is actuated simultaneously therewith to, in turn, actuate shut-off controls within the room. To use one of these typical prior locks for its normal contemplated purpose of providing security requires mechanical disassociation of the lock and said mechanical apparatus. For this, and other reasons, there has been nothing heretofore available, either from the patented literature or from any other source, which enables effective use of the door lock to provide economies associated with hotel or motel management. In this connection, underlying the present invention is the recognition that when a hotel or motel room occupant locks the room door from the corridor side, that to a statistically reliable extent the continued operation of electrical services within the room, such as the air conditioner, is unnecessary and therefore wasteful.

Accordingly, it is broadly an object of the present invention to obviate the wasteful use of electrical devices in the circumstances noted, and otherwise to overcome the foregoing and other shortcomings of the prior art. Specifically, it is an object to effectively use the door security lock as a circuit-breaking switch for the room air conditioner or the like, but without adverse effect on, or inconveniencing, its primary use for security purposes.

A lock advantageously used for a hotel, motel or similar establishment door, which demonstrates objects and advantages of the present invention includes a lock mounted in the pivotally traversable edge of a door having first and second slidably disposed locking bolts, each operatively arranged for sliding movement from a clearance position through a locking stroke into a locking position projected into the door jamb. Associated with each bolt is means for operating same, one from the door side and one from the corridor side. Completing the within combination lock and switch is an electrical circuit and an electrically operated air conditioner operatively associated with each other to provide air conditioning service for said room, and a circuit-breaking switch in said electrical circuit disposed in a strategic location at the terminal end in the path of the locking stroke of the second locking bolt so that incident to said stroke thereof, said circuit-breaking switch is actuated to terminate operation of said air conditioner. As a consequence, both said first and second locking bolts are available to be actuated for security purposes, said first locking bolt internally of the room and without effect on said air conditioner and said second locking bolt externally of the room and simultaneously causing the automatic termination of the operation of said air conditioner.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein.

Figure 3:
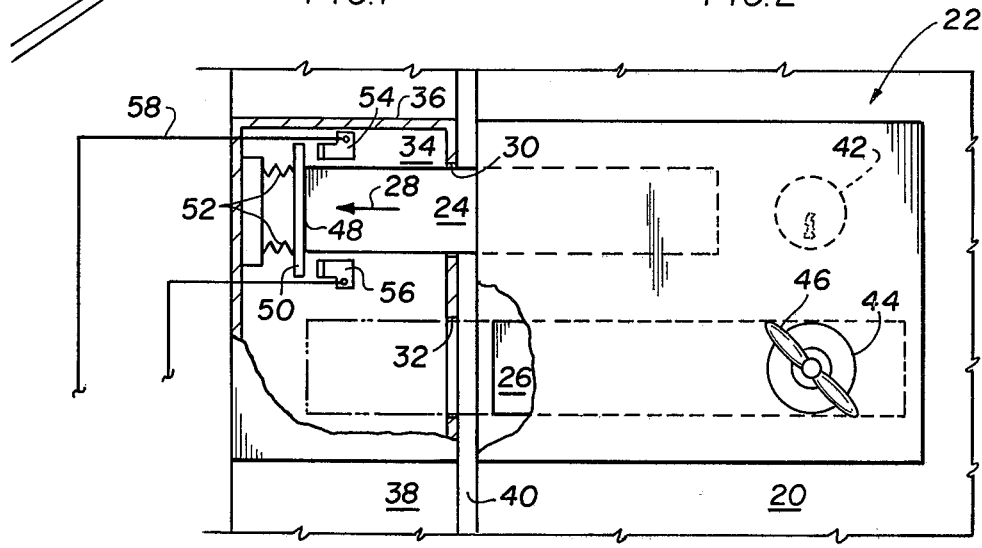
Figure 4:
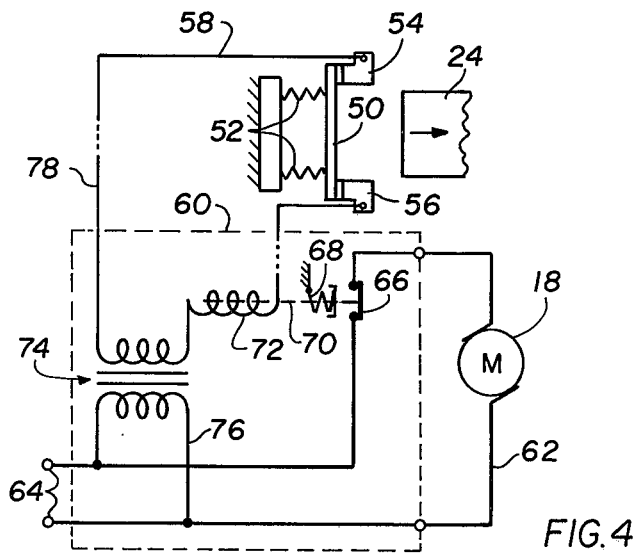

FIG. 3 is an elevational view, partly in section and on an enlarged scale, of the lock used in accordance with the present invention, wherein positions of movement of the lower of two locking bolts are illustrated in full line and phantom line perspective; and FIG. 4 is a circuit diagram illustrating the manner in which the upper locking bolt functions as an electrical switch for an electrical apparatus utilized in the room.

In the claims and in the drawings, the within inventive combination door lock and electrical switch is described in connection with an air conditioner as typically used in a hotel or motel room, or room of some other commercial establishment, but it will be understood that said reference to an air conditioner per se is not intended as a restriction or limitation on the scope of the invention. From the description which follows, it should be obvious that instead of an air conditioner the invention can also be applied to electric lights of the room or other such electrical service, with the same result of terminating the operation thereof when the room is not being used, and thus providing a corresponding saving in electrical costs, as well as a conservation of energy. The air conditioner, however, is an apt electrical apparatus for descriptive purposes, since it is in wide use in hotel and motel rooms and it consumes considerable electricity during use, the savings of which by use of the present invention is therefore significant and of great commercial benefit.

Figures 1, 2:
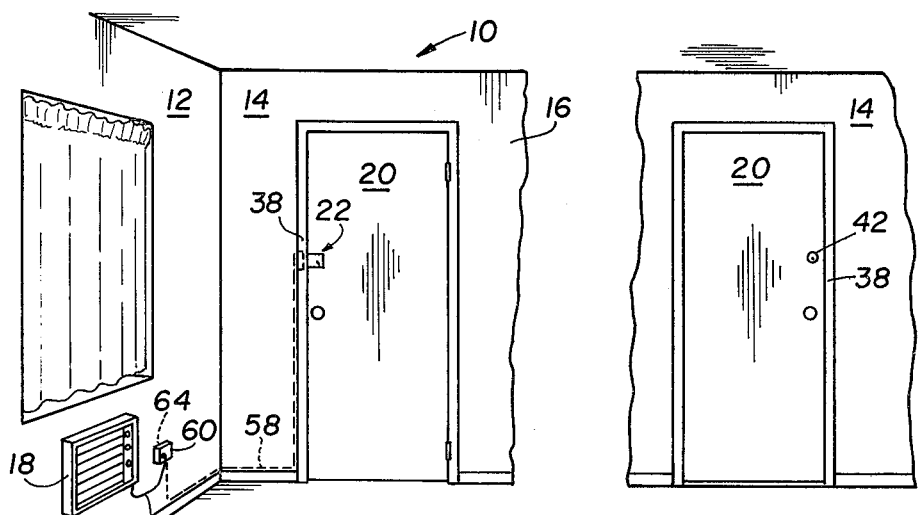
FIG. 1 is a perspective view internally of a building and, more particularly, of the walls thereof which bound a room of the builing, in connection with which advantageous use is made of the combination door lock and electrical switch hereof.
FIG. 2 is a front elevational view of the door to said room, on the corridor side.

Referring to the drawings, FIG. 1 is intended to depict what exists internally of a typical building construction 10 and, more particularly, illustrates the walls thereof, such as walls 12 and 14, which cooperate to bound or provide a typical room area 16 which, also typically, has an electrically operated air conditioner 18 for cooling purposes, which might be wall mounted as illustrated, or otherwise appropriately installed in relation to the room 16. Room 16 also has door 20 for security purposes. FIG. 1 illustrates door 20 from the room side, whereas FIG. 2 illustrates the same from the outside or corridor side.

In accordance with the present invention, and as is perhaps best illustrated in FIG. 3, door 20 is provided with a unique lock 22, the uniqueness of which will become evident as the description proceeds. Except as noted, however, lock 22 is conventional in that it may be a variation of commercially available models, as such being a single or double-action type rim lock, a surface-mounted or recessed type, and/or a cylinder lock, or other such lock which applied to the door 20 will prevent unauthorized entry. Such a lock 22 will suit the purposes of the present invention when embodied with the structural features now to be described. More particularly, and in accordance with the present invention, lock 22 includes upper and lower slidably disposed bolts 24 and 26, respectively. Each bolt 24, 26 is adapted, by any appropriate means, to be actuated through a movement or locking stroke 28 from an initial starting or clearance position into an operative position locking the door, the latter operative position being illustrated by bolt 24. The two positions just referred to are exemplified by the full line and phantom line positions of bolt 26.

In the locking position of each bolt 24, 26, the forward end is projected respectively through openings 30, 32 into a recess 34 of a cooperating female lock member 36 which is mounted in the door jamb 38. The locking position of either of the bolts 24 and 26 are thus positions in which each extends in spanning relation across the opening 40 between the pivotally traversable door edge 42 and the stationary door jamb 38, the same providing a closed or locked position for the door 12 relative to the room 16. This, of course, prevents entry into the room 16 by anyone who does not have a key to operate the tumbler from the corridor side of the door, all in a manner as is well understood.

More particularly, it will be understood that on the room side of door 20, that lock 22 has a bolt movement-actuating mechanism 44 for urging the lower bolt 26 through its locking stroke into its operative position, as illustrated in phantom perspective in FIG. 3, in which it effectively locks door 20 closed. This is the only function provided by the bolt 26. Naturally, by manipulating the hand grip 46 of the mechanism 44 in a clockwise direction, bolt 26 is returned to its initial position, thereby unlocking the door 20.

In accordance with the present invention, upper bolt 24 in addition to locking door 20 closed from the corridor side also functions as an electrical switch in connection with terminating the electrical services that might still be in operation at that time within room 16. In this connection, and as illustrated in FIG. 3, during the terminal end of the locking stroke 28 of upper bolt 24 the leading end thereof makes contact, as at 48, with a switch element 50 biased by spring 52 in a switch-closing position spanning the electrical contacts 54 and 56. Thus, when bolt 24 is urged into its door-closing position as illustrated in FIG. 3, it opens switch 50, 54, 56 and thus breaks the electrical circuit exemplified by the electrical conductor 58. As illustrated in FIG. 1, circuit 58 is connected in supervising control to a terminal box 60 which also has electrically connected to it conductor 62 of the air conditioner 18.

The manner in which circuit 58 supervises electrical energization of, and therefore the operation of, the air conditioner 18 is best understood from the diagrammatic illustration of FIG. 4. Illustrated therein is the electrical motor 18 of the air conditioner which normally is energized by the circuit 62 when the conductor which comprises this circuit is electrically connected to the wall socket or electricity source 64. Circuit 62, however, includes a circuit-breaking switch 66 which is normally biased by spring 68 into an open or circuit-breaking position except when the rod-like body 70 of switch 66 is urged in movement against the opposition of the spring 68 by a solenoid 72. Solenoid 72, in turn, is energized via a transformer 74, the high voltage coil 76 of which is electrically connected to the circuit 62 and thus to the electricity source 64, and the lower voltage coil of which is designated 78 and will be understood to be part of the previously noted switch circuit 58. Thus, when the switch element 50 under the urgency of spring 52 completes the circuit 58 through the contacts 54 and 56, solenoid 72 is effective in maintaining switch 66 closed and this, in turn, allows operation of the air conditioner 18. As illustrated in FIG. 4, this occurs whenever the lock upper bolt 24 is retracted to its clearance position. Naturally, it is assumed that the air conditioner 18 also has an "on-off" switch which also permits the user to exercise the option whether or not to operate the air conditioner. However, assuming that the air conditioner's main switch is "on", there is no option given to the room occupant to keep the air conditioner 18 in operation when there is nobody in the room thereby requiring room door 20 to be closed for security purposes. As already indicated, under these conditions, the upper locking bolt 24 is actuated from the corridor side which results in the locking of the door 20 and also results in the switch element 50 being actuated clear of the contacts 54 and 56, thereby opening or breaking the circuit 58, 78 for the solenoid 72. When this occurs, spring 68 opens switch 66, thus breaking the energizing circuit 62 for the air conditioner 18 and resulting in the termination of its operation.

From the foregoing, it should be readily appreciated that lock 24 thus functions effectively not only in maintaining security for the room 20 when it is desired, but also in functioning as a supervising electrical switch for the electical services in the room, as exemplified by the air conditioner 20 and, more particularly, to terminate the operation thereof when there are no occupants in the room requiring the use of the electrical services. The combination door lock and electrical switch 22 according to the present invention thus significantly contributes to minimizing the expense for electricity for hotel or motel rooms which use the lock 22 in the advantageous manner herein described. Although what has been described is that of a preferred embodiment, a latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. For advantageous use for a hotel room having a door adapted to be locked for security purposes and an electrically operated air conditioner for cooling said room, a combination door lock and switch for terminating the operation of said air conditioner comprising wall means of said room bounding a door opening, a door pivotally mounted in said door opening, a lock mounted in the pivotally traversable edge of said door, first and second slidably disposed locking bolts of said lock each operatively arranged for sliding movement from a clearance position through a locking stroke into a locking position projected into said room wall means for maintaining said door in a closed condition in said door opening, a first locking bolt actuating means on said door accessible only internally of said room operatively effective to operate one said cooperating locking bolt, a second locking bolt actuating means on said door accessible only externally of said room operatively effective to operate the other said cooperating locking bolt, an electrical circuit and an electrically operated air conditioner operatively associated to provide air conditioning service for said room, and a circuit-breaking switch in said electrical circuit disposed in a strategic location at the terminal end in the path of said locking stroke of said second locking bolt so that incident to said stroke thereof said circuit-breaking switch is actuated to terminate operation of said air conditioner, whereby both said first and second locking bolts are available to be actuated for security purposes, said first locking bolt internally of said room and without effect on said air conditioner and said second locking bolt externally of said room and simultaneously causing the automatic termination of the operation of said air conditioner.

2. A room door combination lock and electrical switch as claimed in claim 1 including a transformer in said electrical circuit to provide an optimum minimum voltage across said circuit-breaking switch for safety purposes.

3. A room door combination lock and electrical switch as claimed in claim 2 wherein said circuit-breaking switch includes a vertically oriented spring-biased switch element, and said second locking bolt is slidable horizontally so as to abut aganst said switch element during the terminal portion of said locking stroke thereof.

* * * * *